Figure 1:
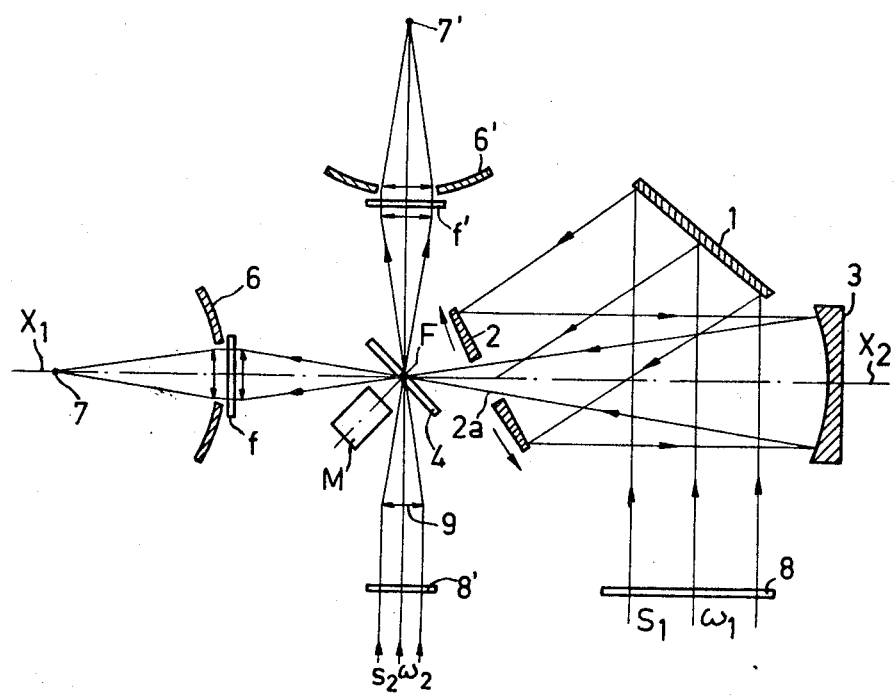

United States Patent
Loy

[11] 3,722,282
[45] Mar. 27, 1973

[54] APPARATUS FOR REMOTELY DISPLAYING TEMPERATURE DIFFERENCES OF AN OBJECT

[75] Inventor: Fernand Rene Loy, Choisy-le-roi, France

[73] Assignee: U.S. Philips Corporation, New York, N.Y.

[22] Filed: Oct. 22, 1970

[21] Appl. No.: 83,104

[30] Foreign Application Priority Data

Sept. 26, 1969 France..................................6932987

[52] U.S. Cl....................73/355 R, 350/161, 356/45, 356/46
[51] Int. Cl...............................G01j 5/62, G02f 1/34
[58] Field of Search......73/355 R, 355 EM; 350/161; 356/45, 46

[56] References Cited

UNITED STATES PATENTS

| | | |
|---|---|---|
| 3,611,806 | 10/1971 | Hishikari..........................73/355 R |
| 2,848,626 | 8/1958 | Brackmann......................73/355 R X |
| 2,963,910 | 12/1960 | Astheimer..........................73/355 R |
| 2,879,424 | 3/1959 | Garbuny et al. .................73/355 R X |
| 3,264,931 | 8/1966 | Ackermann et al.............73/355 R X |
| 3,338,656 | 8/1967 | Astheimer........................350/161 X |

Primary Examiner—Louis R. Prince
Assistant Examiner—Frederick Shoon
Attorney—Frank R. Trifari

[57] ABSTRACT

An analyzing device for displaying temperature differences of an object in which a modulator device is inclined at an angle to the principal axis of the analyzing device and alternately transmits the rays which emanate from a point of the scene to be analyzed and a reference beam which indicates the mean temperature of the said scene.

2 Claims, 4 Drawing Figures

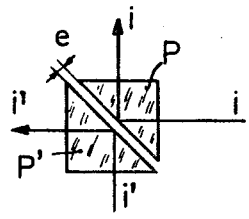
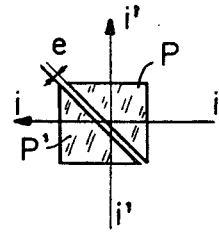
Fig. 2a  Fig. 2b
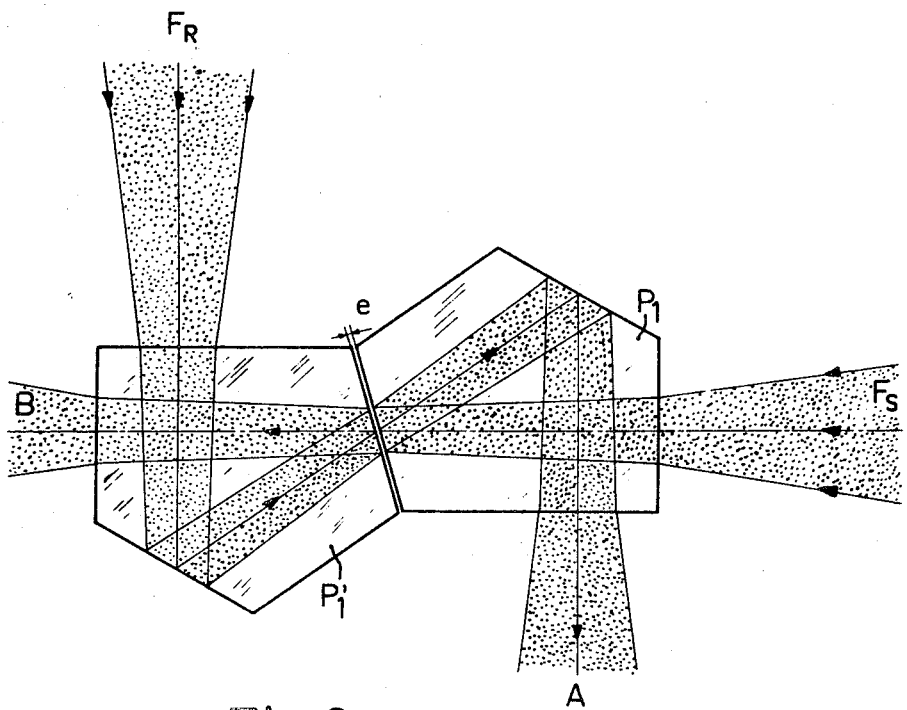
Fig. 2c
INVENTOR.
BY  FERNAND RENE LOY
AGENT

APPARATUS FOR REMOTELY DISPLAYING TEMPERATURE DIFFERENCES OF AN OBJECT

The present invention relates to an analyzing device for an apparatus for remotely displaying temperature differences of an object comprising a converging optical system and a centrally apertured oscillating plane mirror which is arranged at an angle to the principal axis of the optical system between this system and its focus, which device further comprises a modulator which modulates the radiation emanating from the object.

The present invention is an improvement over French Pat. specification No. 1,600,930.

The apparatus for remotely displaying temperature differences of an article, hereinafter for brevity to be referred to as thermal viewing apparatus, according to the aforesaid French patent is provided with an analyzing device which by opticalmechanical means and with the aid of detectors sensitive to infrared radiation scans the object, and with a display device containing electroluminescent diodes.

In order to prevent the occurrence of very-low-frequency noise due to the cooling systems of the detectors in the known analyzing device, the received beam of radiation is modulated so as to operate in the frequency range between 20 kHz and 40 kHz (for an InSb detector).

In the apparatus described in the French patent this modulation is obtained by means of a rotating disc which is arranged at right angles to the optical axis of the analyzing device and contains alternate reflecting and transmitting areas. When a reflecting portion of the disc screens the beam emanating from the scene to be displayed, the detector delivers a signal which is proportional to the temperature $t$ of the detector. When a transmitting portion of the modulator disc transmits the beam emanating from the scene to be displayed, the detector delivers a signal which is proportional to the temperature T of the scene. Thus, the signal delivered by the detector is proportional $(T-t)$, where $(T-t)$ is large compared with the small temperature differences $\Delta T$ to be detected in the scene to be displayed.

The present invention provides a device which does not suffer from this disadvantage and in which the mean temperature of the scene itself and not the temperature of the detector is used as the reference temperature $t$. As a result, $(T-t)$ is of the same order of magnitude as is $\Delta T$.

In the device according to the invention the central axis of the modulator is inclined at an angle to the principal axis of the optical system, the disposition of the modulator relative to the object being such that the modulator alternately transmits the radiation which emanates from the object and a reference radiation which indicates the mean temperature of the object.

This arrangement permits obtaining an interesting modification of the analyzing device so that it includes two detectors each of which operate in a different wavelength range and which alternately receive the analyzing beam and the reference beam.

Embodiments of the invention will now be described, by way of example, with reference to the accompanying diagrammatic drawings, in which:

FIG. 1 shows schematically the analyzing device of a thermal remote viewing apparatus according to the invention, and FIG. 2 shows schematically a modification of the beam switching means.

In the Figures, elements which correspond to those shown in FIG. 1 of the main application are designated by like reference numerals.

In the device shown in FIG. 1 a parallel infra-red radiation beam emitted from a point of the scene to be analyzed enters through a port or window 8 to strike a reflecting mirror 1. A plane oscillating mirror 2 receives the rays reflected by the mirror 1 and reflects them to a stationary concave spherical mirror 3. The axis of the mirror 3 coincides with the optical axis $X_1X_2$ of the analyzing device. After reflection at the mirror 3, the beam passes through an aperture 2a provided centrally of the oscillating mirror 2 and then converges at F, the focus of the mirror 3.

A modulator disc 4 is arranged at F at an angle of (in the embodiment under consideration) 45° to the principal axis $X_1X_2$. This disc is rotated by a motor M. The disc comprises radial areas which are alternately reflecting and transmitting. When a transmitting area of the modulator disc 4 transmits the beam emanating from the scene to be analyzed, a detector 7 measures the temperature of an elemental point of the scene viewed in the elemental field $\omega_1$. When a reflecting area of the modulator disc intercepts the beam emanating from the scene, a reference beam which enters through the port 8' and passes through an objective 9 strikes the detector 7.

The spherical mirror 3, having a surface ares $S_1$ and the detector 7 determine an elemental field $\omega_1$; the geometrical dimensions $S_1\omega_1$ are equal to the geometrical dimensions $S_2\omega_s$ of the objective 9, the area $S_2$ being smaller than $S_1$ and the field $\omega_2$ being greater than $\omega_1$. The field $\omega_2$ is determined by the objective 9 and by the detector 7.

Under these conditions, the flux received in the field $\omega_1$ and that received in the field $\omega_2$ are equal when the temperature of the scene is equal in both fields.

The field $\omega_2$ is fixed: hence the flux received in this field is constant and has the mean value of the scene, corresponding to the mean temperature $t$ of the scene. The elemental field $\omega_1$ is variable, it analyses the scene dot by dot: hence the flux received in this field is variable and corresponds to temperatures $t + \Delta t$ of the scene.

The Figure also illustrates a modification of the analyzing device which has been made possible by the arrangement of the modulation disc at an angle to the axis $X_1X_2$.

If a second detector 7' is disposed above the modulator disc 4 in the axis of the reference beam, this detector 7' will receive the analyzing beam when the detector 7 receives the reference beam and vice versa.

By choosing suitable detectors 7 and 7', for example by using a InSb - detector 7 operating at a wavelength of 4 $\mu$um and a HgCdTe detector 7' operating at a wave length of 10 $\mu$um, and by inserting in the path of the beam which strikes the detector 7 a filter $f$ which transmits radiation having a wavelength between 3 $\mu$um and 5 $\mu$um and by inserting in the path of the beam which strikes the detector 7' a filter $f'$ which transmits radiation having a wavelength between 8 $\mu$um and 14 $\mu$um a thermal remote viewing apparatus is obtainable which provides a two-color display.

In FIG. 1, the optical axis of the reference beam is parallel to that of the analyzing beam. This arrangement enables the system to be automatically adjusted to the mean temperature of the scene. However, the device according to the invention need not necessarily have this arrangement. Alternatively, the reference beam may emanate from a body of known temperature, in which case the system allows an absolute measurement of the temperatures of the scene relative to the reference temperature.

In another modification, the beam may be switched by other means than those described with reference to FIG. 1, for example a total-reflection prism (FIG. 2).

It is known that if the gap $e$ between the hypotenuse faces of the two total-reflection prisms P and P' is greater than the wavelength of the radiation, rays $i$ and $i'$ will experience total reflection (FIG. 2a).

If on the other hand the gap $e$ is of the order of $\lambda/10$, the rays $i$ and $i'$ will be almost completely transmitted by the two prisms which then behave as plates having parallel faces (FIG. 2b).

Relative displacement of the prisms in order to change $e$ may be obtained, for example, by means of piezoelectric elements.

FIG. 2c is a sectional view of two total reflection prisms made of germanium, which material transmits infrared radiation (reflective index $n=4$).

When the gap $e$ between the two prisms $P_1$ and $P'_1$ is large, the beam emanating from a scene $F_S$ will experience two total reflections in the prism $P_1$ and will emerge from the assembly in a direction A; a reference beam $F_R$ experiences two total reflections in the prism $P'_1$ and emerges in a direction B. When the gap $e$ between the two prisms is small ($\approx \lambda/10$) the beam $F_S$ will be transmitted by both prisms without being deviated and emerges from the assembly in the direction B, whereas the beam $F_R$ emerges in the direction A after being reflected in both prisms.

What is claimed is:

1. Analyzing device for an apparatus for remotely displaying temperature optical differences of an object comprising a converging optical system and a centrally apertured oscillating plane mirror which is arranged at an angle to the principal axis of the optical system between said optical system and the focus thereof, said device further comprising a modulator which modulates the thermal radiation emanating from small elements of the object through said optical system, means responsive to a larger field than said optical system to obtain reference radiation representative of the mean temperature, and first and second detectors each responsive to radiation of different wave-lengths, said modulator having a central axis which is inclined at an angle to the principal axis of the optical system, said modulator being disposed relative to the object to transmit the radiation emanating from the object to the first detector and said reference radiation to the second detector to indicate the mean temperature.

2. A device as claimed in Claim 1 characterized in that the modulator includes means for directing the radiation emanating from the object and the reference radiation to the respective detectors comprising an assembly of two adjacent total-reflection prisms, and means to periodically vary the spacing between the opposed faces of the prisms.

* * * * *